(12) United States Patent
Uchimura et al.

(10) Patent No.: US 10,362,287 B2
(45) Date of Patent: Jul. 23, 2019

(54) INFORMATION PROCESSING APPARATUS, INFORMATION PROCESSING METHOD AND PROGRAM, AND RECORDING MEDIUM

(71) Applicant: SONY CORPORATION, Tokyo (JP)

(72) Inventors: Kouichi Uchimura, Kanagawa (JP); Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 82 days.

(21) Appl. No.: 15/501,947

(22) PCT Filed: Aug. 28, 2015

(86) PCT No.: PCT/JP2015/074342
§ 371 (c)(1),
(2) Date: Feb. 6, 2017

(87) PCT Pub. No.: WO2016/039170
PCT Pub. Date: Mar. 17, 2016

(65) Prior Publication Data
US 2017/0223327 A1    Aug. 3, 2017

(30) Foreign Application Priority Data

Sep. 12, 2014  (JP) ................................. 2014-185965

(51) Int. Cl.
*H04N 9/79* (2006.01)
*H04N 1/60* (2006.01)
(Continued)

(52) U.S. Cl.
CPC .............. *H04N 9/79* (2013.01); *G11B 20/10* (2013.01); *G11B 27/105* (2013.01);
(Continued)

(58) Field of Classification Search
USPC .................................. 345/589; 382/254, 162
See application file for complete search history.

(56) References Cited

U.S. PATENT DOCUMENTS

2015/0003749 A1*  1/2015  Kim .................... H04N 19/463
                                                          382/232
2015/0042890 A1*  2/2015  Messmer ................. H04N 5/20
                                                          348/725
(Continued)

FOREIGN PATENT DOCUMENTS

JP         2010-268432     11/2010
WO     WO2012/147350 A1   11/2012
(Continued)

*Primary Examiner* — Wesner Sajous
(74) *Attorney, Agent, or Firm* — Paratus Law Group, PLLC

(57) ABSTRACT

The present disclosure relates to an information processing apparatus, an information processing method and a program, and a recording medium that can generate graphics in colors in a predetermined dynamic range from the data of graphics of colors in a plurality of dynamic ranges. A processor identifies an SDR PDS that is an information item of a color in the SDR available for the graphics, an HDR PDS that is an information item of a color in the HDR available for the graphics from a graphics stream including the SDR PDS, and the HDR PDS, and a segment_type used to identify the SDR PDS and the HDR PDS on the basis of the segment_type. A CLUT management unit generates the SDR graphics on the basis of the SDR PDS identified by the processor. The present disclosure can be applied, for example, to a reproducing device.

12 Claims, 14 Drawing Sheets

(51) Int. Cl.
  *H04N 5/91*      (2006.01)
  *G09G 5/02*      (2006.01)
  *G06T 11/00*     (2006.01)
  *H04N 5/92*      (2006.01)
  *G11B 20/10*     (2006.01)
  *H04N 1/00*      (2006.01)
  *H04N 1/21*      (2006.01)
  *G11B 27/10*     (2006.01)

(52) U.S. Cl.
  CPC ......... *H04N 1/00015* (2013.01); *H04N 1/212* (2013.01); *H04N 1/6041* (2013.01); *H04N 5/91* (2013.01); *H04N 5/92* (2013.01); *G11B 2220/2541* (2013.01)

(56) References Cited

U.S. PATENT DOCUMENTS

| | | | |
|---|---|---|---|
| 2016/0163356 A1* | 6/2016 | De Haan | H04N 21/234327 386/241 |
| 2017/0142499 A1* | 5/2017 | Oh | H04N 21/8543 |
| 2017/0366794 A1* | 12/2017 | Yahata | H04N 9/8233 |

FOREIGN PATENT DOCUMENTS

| | | |
|---|---|---|
| WO | WO2012/172460 A1 | 12/2012 |
| WO | WO2013/046095 A1 | 4/2013 |

\* cited by examiner

FIG. 3

| SDR Video | HDR Video | BDMV Audio1 | ... | BDMV Audio X1 | PG | IG |

FIG. 4

| Epoch | | | | Epoch | | | | Epoch | | | |
|---|---|---|---|---|---|---|---|---|---|---|---|
| Display Set1 | ... | Display Setn | Display Set1 | ... | Display Setm | Display Set1 | ... | Display Setx |

FIG. 7

```
palette_definition_segment() {
segment_descriptor()
{
 segment_type                              8 bslbf
  segment_length                           16 uimsbf
}
palette_id                                 8 uimsbf
palette_version_number                     8 uimsbf
 while (processed_length < segment_length) {
  palette_entry() {
                palette_entry_id           8 uimsbf
                Y_value                    8 uimsbf
                Cr_value                   8 uimsbf
                Cb_value                   8 uimsbf
                T_value                    8 uimsbf
  }
 }
}
```

FIG. 13

| PGS | WDS | PDS1 | ... | PDS1 | PDS1 | ... | PDSm | PDS1 | ... | PDSn | ODS1 | ... | ODSp | END |

SDR COLOR INFORMATION ITEMS: PDS1 ... PDS1

FIRST HDR COLOR INFORMATION ITEMS: PDS1 ... PDSm

SECOND HDR COLOR INFORMATION ITEMS: PDS1 ... PDSn

INFORMATION PROCESSING APPARATUS, INFORMATION PROCESSING METHOD AND PROGRAM, AND RECORDING MEDIUM

CROSS REFERENCE TO PRIOR APPLICATION

This application is a National Stage Patent Application of PCT International Patent Application No. PCT/JP2015/074342 (filed on Aug. 28, 2015) under 35 U.S.C. § 371, which claims priority to Japanese Patent Application No. 2014-185965 (filed on Sep. 12, 2014), which are all hereby incorporated by reference in their entirety.

TECHNICAL FIELD

The present disclosure relates to an information processing apparatus, an information processing method and a program, and a recording medium and, in particular, an information processing apparatus, an information processing method and a program, and a recording medium that can generate graphics in colors in a predetermined dynamic range from the data of the graphics in colors in a plurality of dynamic ranges.

BACKGROUND ART

The Blu-ray Disc Association (BDA) designed a standard of Blu-ray (a registered trademark) Discs (BDs). For example, in the BD can be recorded a main video, graphics that are a caption and a menu image, and a voice (for example, see Patent Document 1).

The BDA is now developing an ultra high definition (UHD) BD standard. For the UHDBD standard, 4K-resolution extension and high dynamic range (HDR) extension have been discussed.

CITATION LIST

Patent Document

Patent Document 1: Japanese Patent Application Laid-Open No. 2010-268432

SUMMARY OF THE INVENTION

Problems to be Solved by the Invention

In the market, however, there are display devices compatible with HDR and capable of displaying an HDR image, and display devices compatible with a standard dynamic range (SDR) and incapable of displaying an HDR image. Accordingly, BD is required to record both the data of HDR graphics and the data of SDR graphics, and thus the reproducing device needs generating the graphics in a dynamic range of colors that the display device can display from both the data.

In light of the foregoing, the present disclosure can generate graphics in colors in a predetermined dynamic range from the data of graphics in colors in a plurality of dynamic ranges.

Solutions to Problems

An information processing apparatus according to a first aspect of the present disclosure includes: an identifying unit that identifies a first color information item that is information about a color in a first dynamic range available for graphics and a second color information item that is information about a color in a second dynamic range available for the graphics from a graphics stream including the first color information item, the second color information item, and identification information used to identify the first color information item and the second color information item on the basis of the identification information, and a generator that generates the graphics in the color in the first dynamic range on the basis of the first color information item identified by the identifying unit.

The information processing method and program according to the first aspect of the present disclosure correspond to the information processing apparatus according to the first aspect of the present disclosure.

According to the first aspect of the present disclosure, a first color information item that is information about a color in a first dynamic range available for graphics and a second color information item that is information about a color in a second dynamic range available for the graphics are identified from a graphics stream including the first color information item, the second color information item, and identification information used to identify the first color information item and the second color information item on the basis of the identification information, and the graphics in the color in the first dynamic range is generated on the basis of the identified first color information item.

A recording medium according to a second aspect of the present disclosure is a recording medium in which a graphics stream including a first color information item that is information about a color in a first dynamic range available for graphics, a second color information item that is information about a color in a second dynamic range available for the graphics, and identification information used to identify the first color information item and the second color information item is recorded, the recording medium to be attached to an information processing apparatus and reproduced, the recording medium causing the information processing apparatus provided with the graphics stream to identify the first color information item and the second color information item from the graphics stream on the basis of the identification information, and to generate the graphics in the color in the first dynamic range on the basis of the identified first color information item.

According to the second aspect of the present disclosure, a graphics stream including a first color information item that is information about a color in a first dynamic range available for graphics, a second color information item that is information about a color in a second dynamic range available for the graphics, and identification information used to identify the first color information item and the second color information item is recorded, and attached to the information processing apparatus and reproduced.

An information processing apparatus according to a third aspect of the present disclosure includes: a generator that generates a graphics stream including a first color information item that is information about a color in a first dynamic range available for graphics, a second color information item that is information about a color in a second dynamic range available for the graphics, and identification information used to identify the first color information item and the second color information item.

According to the third aspect of the present disclosure, a graphics stream including a first color information item that is information about a color in a first dynamic range available for graphics, a second color information item that is information about a color in a second dynamic range available for the graphics, and identification information used to identify the first color information item and the second color information item is generated.

Effects of the Invention

According to the first aspect of the present disclosure, graphics can be generated. Furthermore, according to the first aspect of the present disclosure, graphics in colors in a predetermined dynamic range is generated from the data of graphics in colors in a plurality of dynamic ranges.

Furthermore, according to the second and third aspects of the present disclosure, graphics can be generated. Furthermore, according to the second and third aspects of the present disclosure, graphics in colors in a predetermined dynamic range is generated from the data of graphics in colors in a plurality of dynamic ranges.

Note that the effects of the present technology are not limited to the effects described above, and may be one of the effects described in the present disclosure.

BRIEF DESCRIPTION OF DRAWINGS

FIG. 3 is a diagram of an exemplary structure of an AV stream.

FIG. 4 is a diagram of an exemplary structure of a graphics stream.

FIG. 7 is a diagram of an exemplary syntax of a PDS.

FIG. 13 is a diagram of another exemplary structure of the DisplaySet of the caption stream.

MODE FOR CARRYING OUT THE INVENTION

Hereinafter, the modes for carrying out the present disclosure (hereinafter, referred to as embodiments) will be described. Note that the embodiments will be described in the following order.

Figure 14:
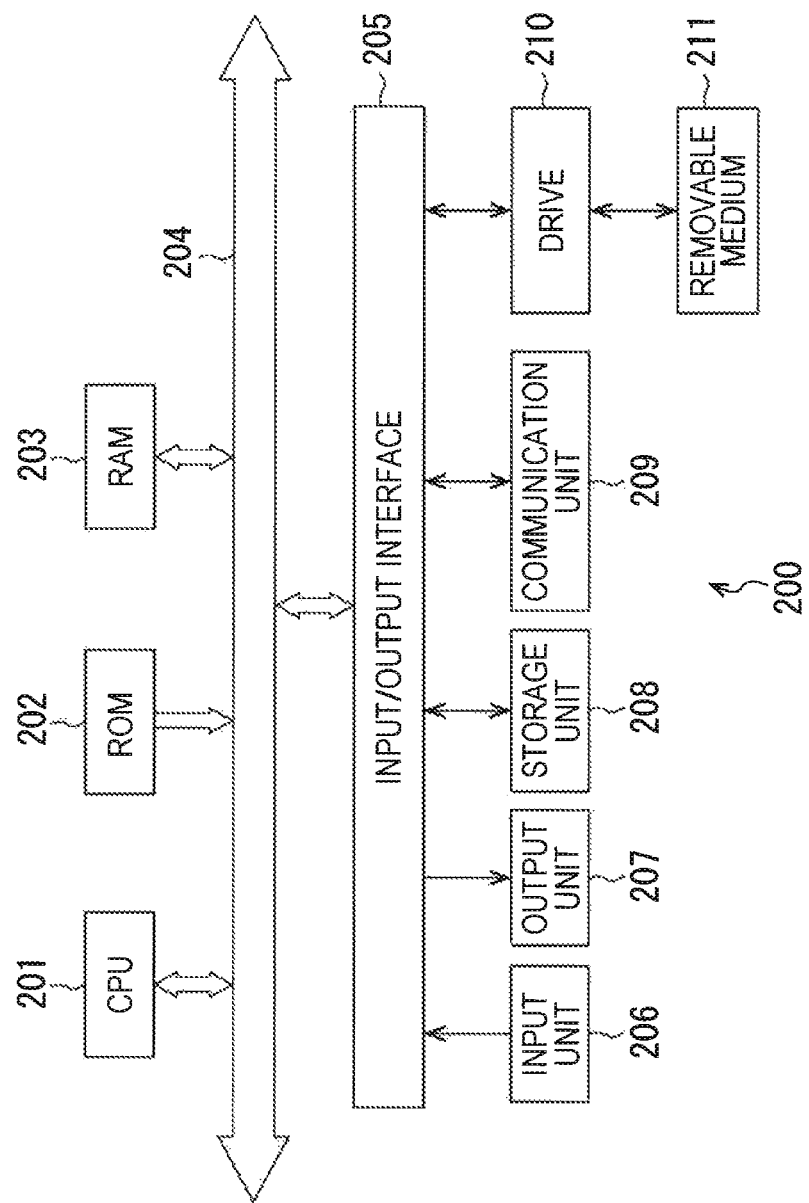
FIG. 14 is a block diagram of an exemplary hardware configuration, of a computer.

1. First Embodiment: Recording/reproducing System (FIGS. 1 to 13)
2. Second Embodiment: Computer (FIG. 14)

First Embodiment (Exemplary Configuration of Embodiment of Recording/Reproducing System)

Figure 1:
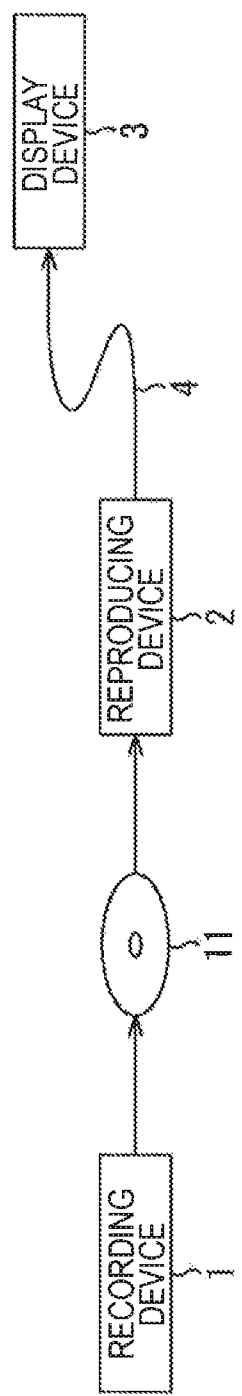
FIG. 1 is a block diagram of an exemplary configuration of an embodiment of a recording/reproducing system to which the present disclosure is applied.

FIG. 1 is a block diagram of an exemplary configuration of an embodiment of a recording/reproducing system to which the present disclosure is applied.

The recording/reproducing system of FIG. 1 includes a recording device 1, a reproducing device 2, and a display device 3. The reproducing device 2 and the display device 3 are connected via a High Definition Multimedia Interface (HDMI) (a registered trademark) cable 4. The reproducing device 2 and the display device 3 can be connected via a cable in another standard, or via a wireless communication.

The recording device 1 records contents including a main video, graphics, and a voice. The reproducing device 2 (an information processing apparatus) reproduces the contents. To provide the contents from the recording device 1 to the reproducing device 2, an optical disc 11 attached to the recording device 1 and the reproducing device 2 is used. The optical disc 11 is a disc in which the contents are recorded in a format, for example, equivalent to a read only memory (BD-ROM) format.

Contents can be recorded in the optical disc 11 in a format equivalent to another format such as BD-R or BD-RE. Alternatively, to provide the contents from the recording device 1 to the reproducing device 2, a removable medium other than the optical disc, for example, a memory card to which a flash memory is installed may be used.

When the optical disc 11 is a BD-ROM disc, the recording device 1 is a device used by the author of the contents. Hereinafter, an example in which the optical disc 11 in which contents are recorded by the recording device 1 is provided to the reproducing device 2 will properly be described. Actually, however, optical discs are duplicated on the basis of a master copy in which the contents are recorded by the recording device 1, and the optical disc 11 that is one of the duplicated optical discs is provided to the reproducing device 2.

To the recording device 1 are input the image data of an HDR main video, the image data of an SDR main video, the image data of HDR graphics, and the image data of SDR graphics, the voice data. The recording device 1 encodes and multiplexes the data to generate an AV stream chat is a transport stream (TS). The recording device 1 records, for example, the generated AV stream in the optical disc 11.

The reproducing device 2 communicates with the display device 3 via the HDMI cable 4 to obtain the information about the display performance of the display device 3. The reproducing device 2 determines whether the display device 3 is a device with an HDR monitor capable of displaying an HDR image, or a device with an SDR monitor capable of only displaying an SDR image.

Furthermore, the reproducing device 2 drives the drive to read the AV stream recorded in the optical disc 11. The reproducing device 2 separates the AV stream into an HDR main video stream that is an elementary stream (ES) of the HDR main video, an SDR main video stream that is an SS of the SDR main video, a graphics stream that is an ES of the HDR and SDR graphics, and an audio stream that is an ES of the voice. The reproducing device 2 decodes the HDR main video stream, the SDR main video stream, and the audio stream.

Furthermore, when the display device 3 includes the HDR monitor, the reproducing device 2 decodes the graphics stream to generate the image data of the HDR graphics. On the other hand, when the display device 3 includes the SDR monitor, the reproducing device 2 decodes the graphics stream to generate the image data of the SDR graphics.

When the display device 3 includes the HDR monitor, the reproducing device 2 outputs both the image data of the HDR main video and the image data of the HDR graphics obtained by the decoding to the display device 3. On the other hand, when the display device 3 includes the SDR monitor, the reproducing device 2 outputs both the image data of the SDR main video and the image data of the SDR graphics obtained by the decoding to the display device 3. Furthermore, the reproducing device 2 outputs the audio data obtained by the decoding to the display device 3.

The display device 3 receives the image data of the SDR or HDR main video and the image data of the SDR or HDR graphics transmitted from the reproducing device 2, and displays the SDR or HDR main video and graphics on the built-in monitor. Meanwhile, the display device 3 receives the audio data transmitted from the reproducing device 2 and outputs the voice from the loudspeaker.

(Directory Structure)

Figure 2:
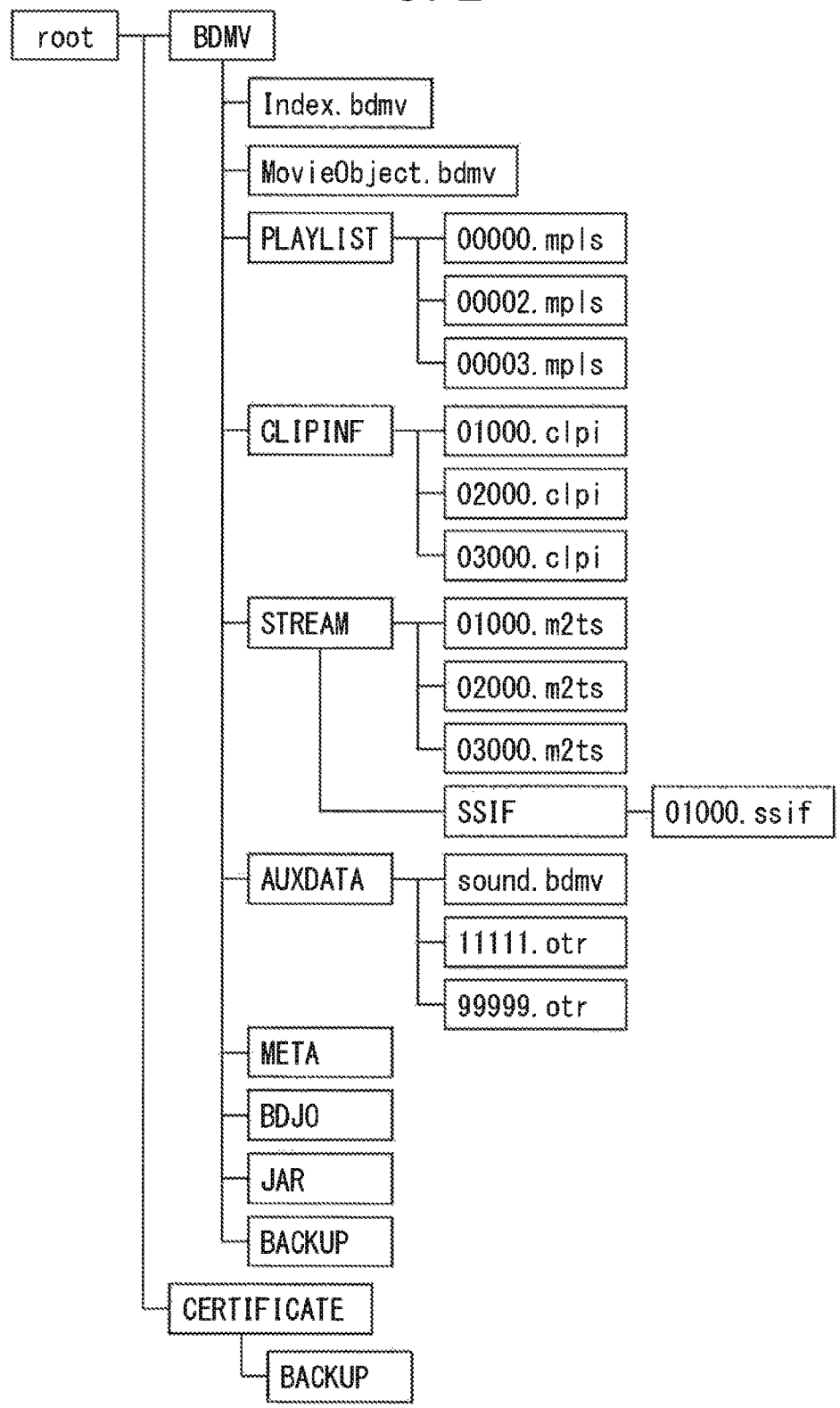
FIG. 2 is a diagram of an exemplary management structure of a file recorded in an optical disc illustrated in FIG. 1.

FIG. 2 is a diagram of an exemplary management structure of a file recorded in the optical disc 11 illustrated in FIG. 1.

Each file recorded in the optical disc 11 is hierarchically managed in a directory structure. A root directory is created on the optical disc 11.

A BDMV directory is placed under the root directory.

Under the BDMV directory are stored an Index file to which a name "Index.bdmv" is given, and a Movie Object file to which a name "MovieObject.bdmv" is given.

In the Index file are described, for example, a list of the numbers of the titles recorded in the optical disc 11, and the types and numbers of the objects to be executed in response to the number of the title. As the types of objects, there are a movie object (Movie Object) and a BD-J object (BD-J Object).

In the movie object is described a navigation command used, for example, to reproduce PlayList. In the BD-J object is described a BD-J application. In the Movie Object file is described the movie object.

Under the BDMV directory are also provided, for example, a PLAYLIST directory, a CLIPINF directory, and a STREAM directory.

In the PLAYLIST directory is stored a PlayList file in which the PlayList used as the reproduction management information used to manage the reproduction of the AV stream is described. Each PlayList file is given a name that is a combination of a five-digit number and an extension ".mpls". One of the PlayList files illustrated in FIG. 2 is given a file name "00000.mpls".

In the CLIPINF directory is stored the information about the AV stream, by a predetermined unit as Clip Information files. Each Clip Information file is given a name that is a combination of a five-digit number and an extension ".clpi". The three Clip Information files illustrated in FIG. 2 are given file names "01000.clpi", "02000.clpi", and "03000.clpi", respectively.

In the STREAM directory is stored the AV stream by a predetermined unit as stream files. Each stream file is given a name that is a combination of a five-digit number and an extension ".m2ts". The three stream files illustrated in FIG. 2 are given file names "01000.m2ts", "02000.m2ts", and "03000.m2ts", respectively.

The Clip Information file and stream file of which file names have the same five-digit number are included in a Clip. To reproduce the stream file "01000.m2ts", the Clip Information file "01000.clpi" is used. To reproduce the stream file "02000.m2ts", the Clip Information file "02000.clpi" used.

(Exemplary Structure of AV Stream)

FIG. 3 is a diagram of an exemplary structure of the AV stream.

As illustrated in FIG. 3, in the AV stream, the packetized elementary stream (PES) packets of the SDR main video stream (SDR Video), HDR main video stream (HDR Video), audio streams (BDMV Audio1, . . . , BDMV AudioX1), the graphics stream of the caption (presentation graphics (PG)), and the graphics stream of the menu image (interactive graphics (IG)) are packetized as TS packets and multiplexed.

In the example of FIG. 3, both the graphics stream of the caption and the graphics stream of the menu image are multiplexed. However, only one of the graphics streams may be multiplexed. Note that, hereinafter, the graphics stream of the caption will be referred to as a caption stream, and the graphics stream of the menu image will be referred to as a menu stream.

(Exemplary Structure of Graphics Stream)

FIG. 4 is a diagram of an exemplary structure of the graphics stream.

As illustrated in FIG. 4, the graphics stream is a data stream by the data unit referred to as Epoch, and can seamlessly be reproduced by the Epoch unit. The Epoch includes an arbitrary number of DisplaySets. The DisplaySet is a graphics stream of the graphics of a screen.

(Exemplary Structure of DisplaySet of Caption Stream)

Figure 5:
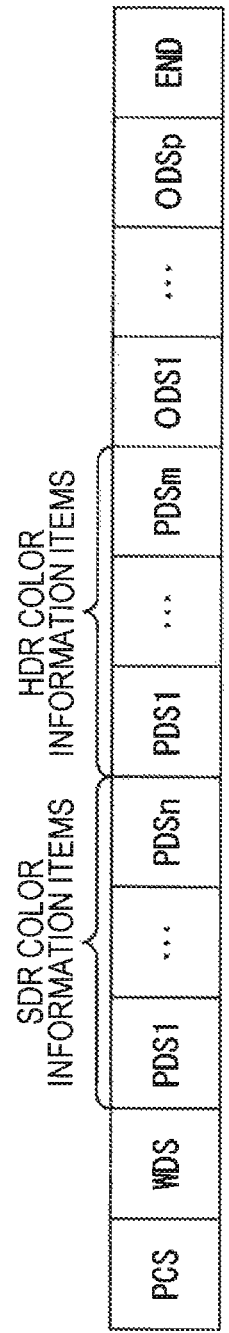
FIG. 5 is a diagram of an exemplary structure of a DisplaySet of a caption stream.

FIG. 5 is a diagram of an exemplary structure of a DisplaySet of the caption stream.

As illustrated in FIG. 5, the DisplaySet of the caption stream includes a presentation composition segment (PCS), a window definition segment (WDS), n palette definition segments (PDSs) of the SDR caption, m PDSs of the HDR caption, p object definition segments (ODSs), and an end of display set segment (END).

The PCS is a segment indicating the beginning of the DisplaySet, and one of the display position information items indicating the positions of the captions and placed in the WDS is placed as the representative information in the PCS. The representative information of the SDR captions is identical to the representative information of the HDR captions and thus the same PCS is used for both the SDR and HDR captions.

In the WDS are placed the display position information items of the captions. The display position in formation items of the SDR captions are identical to the display position information items of the HDR captions and thus the same WDS is used for both the SDR and HDR captions.

In each PDS is placed a color information item indicating the values Y, Cb, and Cr of the colors that can be used as the colors of the captions, and the transparency. The color information items of the SDR captions are different from the color information items of the HDR captions, and thus the PDSs for the SDR captions and the PDSs for the HDR captions are separately provided. Furthermore, in the example of FIG. 5, n (an integer larger than or equal to one) types of the color information can be used as the color information items for the SDR captions in the screen, and thus n PDSs of the SDR captions are provided. Meanwhile, in the example of FIG. 5, m (an integer larger than or equal to one) types of the color information can be used as the color information items for the HDR captions in the screen, and thus m PDSs of the HDR captions are provided.

In each ODS is placed a shape in formation item of the caption, for example, including the pixel value of each pixel of the caption. The shape in formation items of the SDR captions are identical to the shape information items of the HDR captions, and thus the same ODSs are used for both the SDR and HDR captions. In the example of FIG. 5, there are p (an integer larger than or equal to one) captions in a screen, and thus p ODSs are provided. The END is a segment indicating the end of the DisplaySet. Thus, the END is used for both the SDR and HDR captions.

(Exemplary Structure of DisplaySet of Menu Stream)

Figure 6:
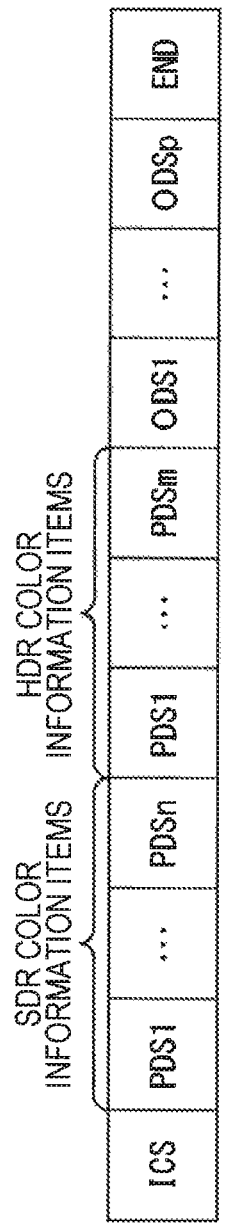
FIG. 6 is a diagram of an exemplary structure of a DisplaySet of a menu stream.

FIG. 6 is a diagram of an exemplary structure of DisplaySet. of a menu stream.

As illustrated, in FIG. 6, the DisplaySet of the menu stream includes an interactive composition segment (ICS), n (an integer larger than or equal to one) PDSs of the SDR menu images, m (an integer larger than or equal to one) PDSs of the HDR menu images, p (an integer larger than or equal to one) ODSs, and an END.

The ICS is a segment indicating the beginning of the DisplaySet, and the menu information such as a command executed when the menu image is controlled is placed in the ICS. The menu information for the SDR menu images is identical to the menu information for the HDR menu images, and thus PCS is used for both the SDR and HDR menu images.

In each PDS is placed a color information item indicating the values Y, Cb, and Cr of the colors that can be used as the color of the menu images, and the transparency. The color information items of the SDR menu images are different from the color information items of the HDR menu images, and thus the PDSs for the SDR menu images and the PDSs for the HDR menu images are separately provided. In the example of FIG. 6, n types of the color information can be used as the color information items for the SDR menu images in the screen, and thus n PDSs of the SDR menu images are provided. Meanwhile, in the example of FIG. 6, m types of the color information can be used as the color information items for the HDR menu images in the screen, and thus m PDSs of the HDR menu images are provided.

In each ODS is placed a shape information item of the menu image, for example, including the pixel value of each pixel of the menu image. The shape information items of the SDR menu images are identical to the shape information items of the HDR menu images, and thus the same ODSs are used for both the SDR and HDR menu images. In the example of FIG. 6, there are p menu images in a screen, and thus p ODSs are provided. The END is a segment indicating the end of the DisplaySet. Thus, the END is used for both the SDR and HDR menu images.

As described above, in the graphics stream, the SDR and HDR graphics use the same segments except for the PDSs, and thus the data amount of the graphics stream can be reduced. Furthermore, the graphics stream is provided with the PDSs of the SDR graphics and the PDSs of the HDR graphics, and thus the reproducing device needs distinguishing the PDSs.

(Exemplary Syntax of PDS)

FIG. 7 is a diagram of an exemplary syntax of a PDS.

As illustrated in FIG. 7, in a PDS is described a segment_type indicating the segment type of the PDS. The segment_type is a value allotted to each type of segments. In this example, the PDSs of the SDR graphics are different types of segments from the PDSs of the HDR graphics. Thus, segment_types with different values are allotted to the PDSs of the SDR and HDR graphics.

For example, as the segment_type of the PDSs of the SDR graphics, 0x14 that is a segment_type allotted to a PDS in the existing BD standard is allotted. As the segment_type of the PDSs of the HDR graphics, 0x19 is allotted. Meanwhile, as segment_types of the ODS, PCS, WDS, ICS, and END, 0x15, 0x16, 0x17, 0x18, and 0x80 are allotted, respectively.

As described above, the segment_type of the PDSs of the SDR graphics differs from the segment_type of the PDSs of the HDR graphics, and thus the reproducing device can identify the PDSs of the SDR graphics and the PDSs of the HDR graphics among the PDSs. Thus, the segment_type of the PDSs of the SDR graphics, and the segment_type of the PDSs of the HDR graphics are identification information items used to identify the PDSs of the SDR graphics and the PDSs of the HDR graphics, Furthermore, in the PDS as illustrated in FIG. 7, the ID of the palette_entry (palette_entry_id), a Y value (Y_value), a Cr value (Cr_value), a Cb value (Cb_value), and a transparency (T_value) are described as the color information for each palette_entry. The palette_entry_id corresponds to the pixel value placed in the ODS, and the reproducing device generates the image data of the graphics on the basis of the Y value, Cr value, Cb value, and transparency of the palette_entry of the palette_entry_id corresponding to the pixel value placed in the ODS.

Note that the present technology relates to an image, and thus the description of the technology relating to a voice will be omitted.

(Exemplary Configuration of Recording Device)

Figure 8:
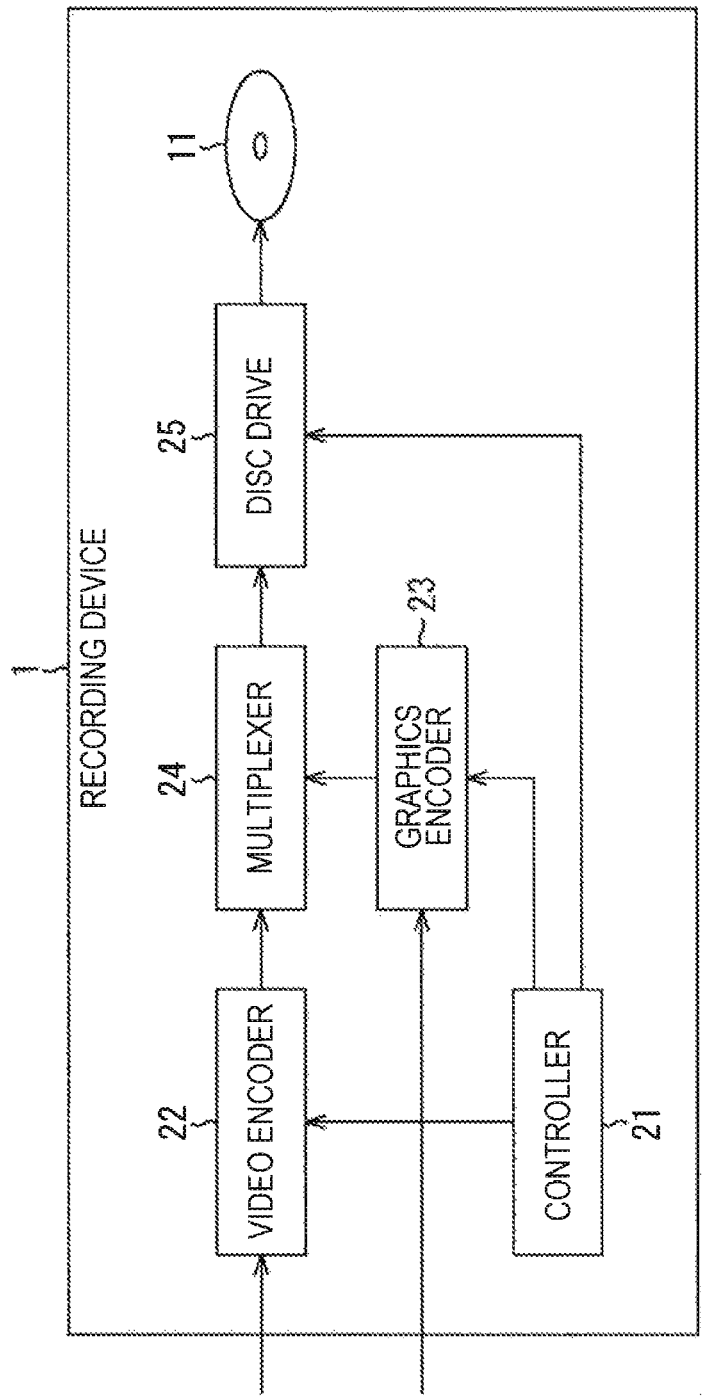
FIG. 8 is a block diagram of an exemplary configuration of a recording device illustrated in FIG. 1.

FIG. 8 is a block diagram of an exemplary configuration of the recording device 1 illustrated in FIG. 1.

The recording device 1 includes a controller 21, a video encoder 22, a graphics encoder 23, a multiplexer 24, and a disc drive 25. The image data of the HDR main video and the image data of the SDR main video are input to the video encoder 22, and the image data of the SDR graphics and the image data of the HDR graphics are input to the graphics encoder 23.

The controller 21 includes, for example, a central processing unit (CPU), a read only memory (ROM), and a random access memory (RAM). The controller 21 executes a predetermined program, and controls the operation of the whole recording device 1. For example, the controller 21 generates PlayList and Clip Information and outputs the PlayList and Clip Information to the disc drive 25 by executing a predetermined program.

The video encoder 22 encodes the image data of the HDR main video and the image data of the SDR main video in accordance with the control by the controller 21. The video encoder 22 outputs the HDR main video stream and SDR main video stream provided by the encoding to the multiplexer 24.

The graphics encoder 23 (generator) encodes the image data of the SDR graphics and the image data of the HDR graphics in accordance with the control by the controller 21. The graphics encoder 23 outputs the graphics stream generated by the encoding to the multiplexer 24.

The multiplexer 24 packetizes the PES packets of the SDR main video stream, and HDR main video stream provided from the video encoder 22 and graphics stream provided from the graphics encoder 23 as TS packets and multiplexes the TS packets. The multiplexer 24 outputs an AV stream provided by the multiplexing to the disc drive 25.

The disc drive 25 stores the PlayList and Clip Information provided from the controller 21, and the AV stream provided from the multiplexer 24 in files, respectively, and records the files to the optical disc 11 in accordance with the directory structure of FIG. 2.

(Description of Process that Recording Device Performs)

Figure 9:
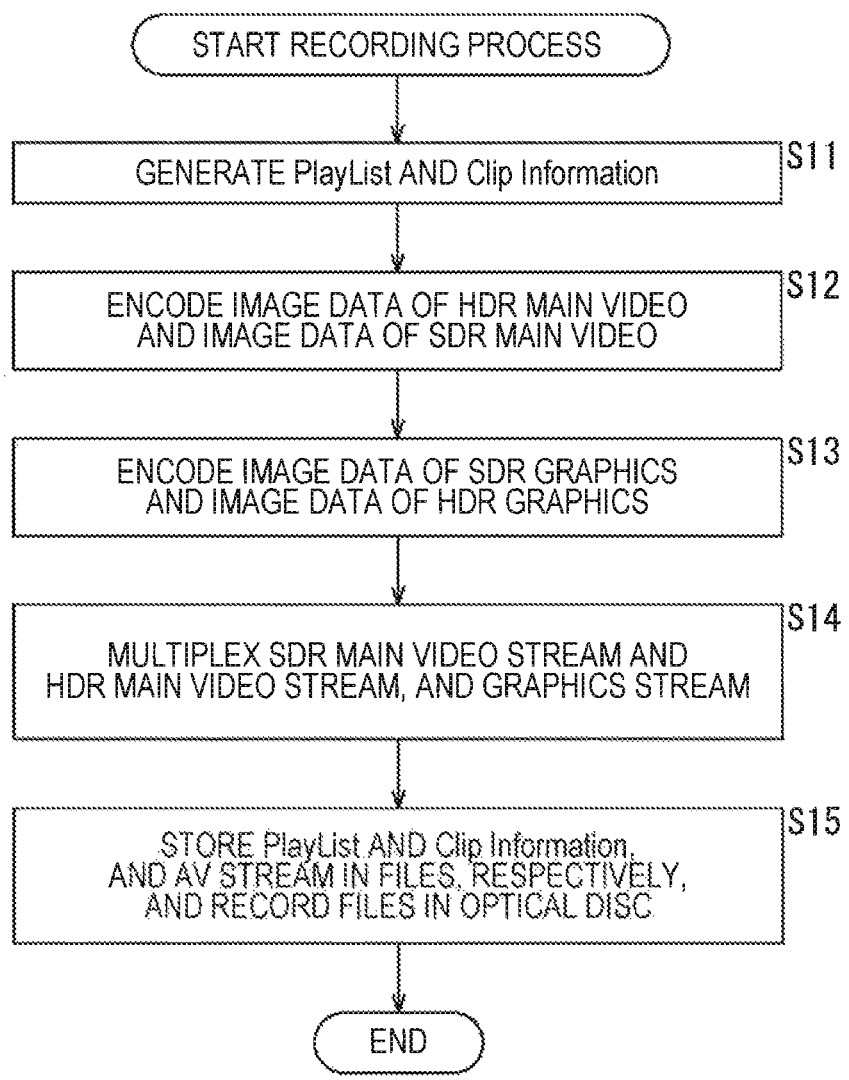
FIG. 9 is an explanatory flowchart of a recording process that a recording device illustrated in FIG. 8 performs.

FIG. 9 is a flowchart of a recording process that the recording device 1 of FIG. 8 performs. This recording process is started, for example, when the image data of the HDR main video and the image data of the SDR main video are input to the video encoder 22, and the image data of the SDR graphics and the image data of the HDR graphics are input to the graphics encoder 23.

In step S11 of FIG. 9, the controller 21 generates PlayList and Clip Information, and outputs the PlayList and Clip Information to the disc drive 25.

In step S12, the video encoder 22 encodes the image data of the HDR main video and SDR main video, and outputs the HDR main video stream and SDR main video stream, provided by the encoding to the multiplexer 24.

In step S13, the graphics encoder 23 encodes the image data of the SDR graphics and the image data of the HDR graphics and outputs the graphics stream provided by the encoding to the multiplexer 24.

In step S14, the multiplexer 24 packetizes the PES packets of the SDR main video stream and HDR main video stream and graphics stream as TS packets and multiplexes the TS packets. The multiplexer 24 outputs an AV stream provided by the multiplexing to the disc drive 25.

In step S15, the disc drive 25 stores the PlayList and Clip Information, and the AV stream in files, respectively, and records the files to the optical disc 11 in accordance with the directory structure of FIG. 2. Then, the process is completed.

(Exemplary Configuration of Reproducing Device)

Figure 10:
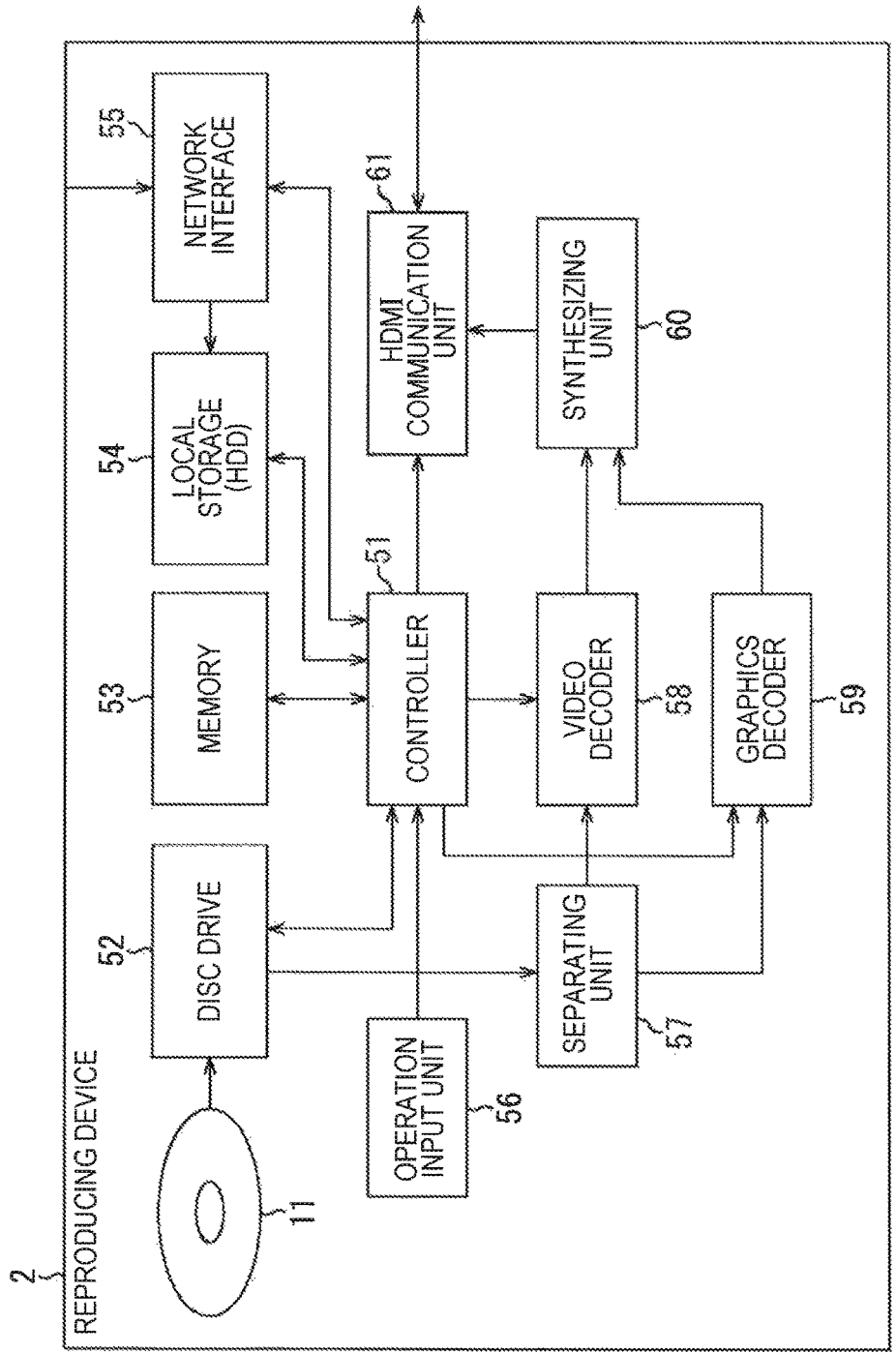
FIG. 10 is a block diagram of an exemplary configuration of a reproducing device illustrated in FIG. 1.

FIG. 10 is a block diagram of an exemplary configuration of the reproducing device 2 of FIG. 1.

The reproducing device 2 includes a controller 51, a disc drive 52, a memory 53, a local storage 54, a network interface 55, an operation input unit 56, a separating unit 57, a video decoder 58, a graphics decoder 59, a synthesizing unit 60, and an HDMI communication unit 61.

The controller 51 includes, for example, a CPU, a ROM, and a RAM. The controller 51 controls the operation of the whole reproducing device 2, for example, in response to the operation signal from the operation input unit 56 by executing a predetermined program. For example, the controller 51 controls the reproduction of the AV stream on the basis of the PlayList and Clip Information provided, from the disc drive 52.

Furthermore, When it is determined that the display device 3 includes an HDR monitor on the basis of the information about the performance of the monitor included in the display device 3 provided from the HDMI communication unit 61, the controller 51 instructs the video decoder 58 to decode the HDR main video stream. On the other hand, when the display device 3 includes an SDR monitor, the controller 51 instructs the video decoder 58 to decode the SDR main video stream.

Furthermore, when it is determined that the display device 3 includes an HDR monitor on the basis of the information about the performance of the monitor included in the display device 3, the controller 51 instructs the graphics decoder 59 to generate the image data of the HDR graphics. On the other hand, when the display device 3 includes an SDR monitor, the controller 51 instructs the graphics decoder 59 to generate the image data of the SDR graphics.

The disc drive 52 reads the PlayList and Clip Information from the optical disc 11 and outputs the PlayList and Clip Information to the controller 51 in accordance with the control by the controller 51. Furthermore, the disc drive 52 reads the AV stream, to be reproduced from the optical disc 11 and outputs the AV stream to the separating unit 57 in accordance with the control by the controller 51.

The memory 53 stores, for example, the data necessary for the controller 51 to perform various processes. The data stored in the memory 53 is read by the controller 51 as necessary, The local storage 54 includes, for example, a hard disk drive (HDD). The local storage 54 records the data provided from the network interface 55, for example, in accordance with the control by the controller 51.

The network interface 55 downloads the data from a server by communicating with the server via a network such as the Internet in accordance with the control by the controller 51. The network interface 55 provides the downloaded data to the local storage 54.

The separating unit 57 separates the SDR main video stream, the HDR main video stream, and the graphics stream from the AV stream provided from the disc drive 52. The separating unit 57 outputs the separated SDR main video scream and HDR main video stream to the video decoder 58, and outputs the graphics stream to the graphics decoder 59.

The video decoder 58 decodes the SDR main video stream or HDR main video stream provided from, the separating unit 57 in accordance with the instructions from the controller 51. The video decoder 58 outputs the image data of the SDR main video or the image data of the HDR main video provided by the decoding to the synthesizing unit 60.

The graphics decoder 59 decodes the graphics stream provided from the separating unit 57 and generates the image data of the SDR graphics or the image data of the HDR graphics in accordance with the instructions from the controller 51. The graphics decoder 59 outputs the generated image data of the SDR graphics or the generated image data of the HDR graphics to the synthesizing unit 60.

The synthesizing unit 60 synthesizes the image data of the HDR main video provided from the video decoder 58 and the image data of the HDR graphics provided from the graphics decoder 59. Alternatively, the synthesizing unit 60 synthesizes the image data of the SDR main video provided from the video decoder 58 and the image data of the SDR graphics provided from the graphics decoder 59. The synthesizing unit 60 outputs the HDR image data or SDR image data provided by the synthesis to the HDMI communication unit 61.

The HDMI communication unit 61 communicates with the display device 3 via the HDMI cable 4. For example, the HDMI communication unit 61 obtains the information about the performance of the monitor included in the display device 3 and outputs the information to the controller 51. Furthermore, the HDMI communication unit 61 outputs the HDR image data or SDR image data provided from the synthesizing unit 60 to the display device 3.

(Exemplary Configuration of Graphics Decoding Process Unit)

Figure 11:
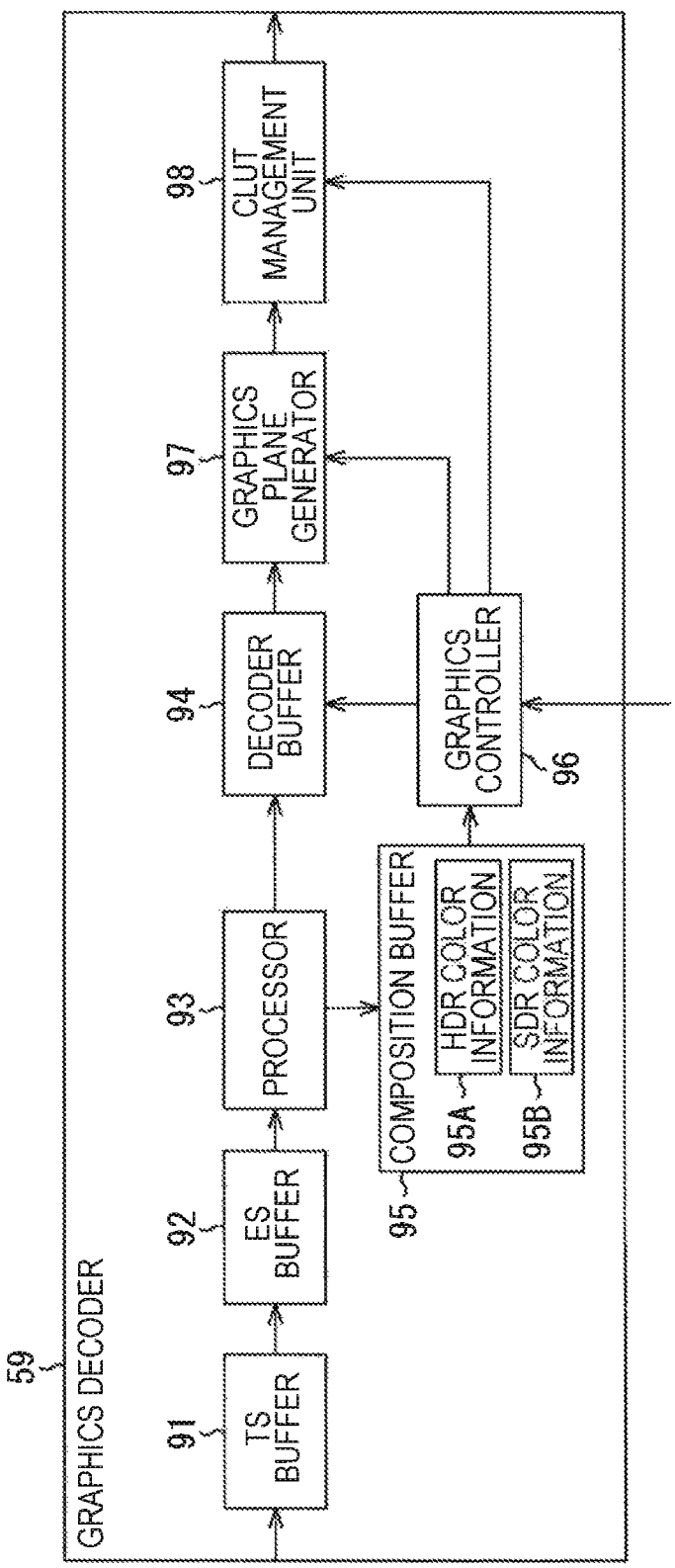
FIG. 11 is a block diagram of an exemplary configuration of a graphics decoder illustrated in FIG. 10.

FIG. 11 is a block diagram of an exemplary configuration of the graphics decoder 59 of FIG. 10.

The graphics decoder 59 includes a TS buffer 91, an ES buffer 92, a processor 93, a decoder buffer 94, a composition buffer 95, and a graphics controller 96, the graphics plain generator 97, and a CLUT management unit 98.

The TS buffer 91 stores the TS packets of the graphics stream provided from the separating unit 57 of FIG. 10. The TS buffer 91 outputs the graphics stream including the stored TS packets to the HIS buffer 92.

The ES buffer 92 stores the graphics stream provided from the TS buffer 91.

The processor 93 reads the graphics stream from the ES buffer 92. The processor 93 extracts the segments from the read graphics stream. The processor 93 (identification unit) identifies the PCS, WDS, PDSs of the SDR graphics, PDSs of the HDR graphics, ODSs, ICS, and END on the basis of the segment_type included in each segment.

The processor 93 provides the information items placed in the identified PCS, WDS, PDSs of the HDR graphics, PDSs of the SDR graphics, and ICS as the control information to the composition buffer 95. Furthermore, the processor 93 provides and stores the shape information items placed in the identified ODSs into the decoder buffer 94.

The decoder buffer 94 stores the shape information items provided from the processor 93. The shape information items are read at a reading timing controlled by the graphics controller 96 and provided to the graphics plain generator 97.

The composition buffer 95 stores the control information provided from the processor 93. By this storage, in the composition buffer 95 are stored the HDR color information 95A that is the color information of the HDR graphics, and the SDR color information 95B that is the color information of the SDR graphics.

The graphics controller 96 reads the control information except for the HDR color information 95A and SDR color information 95B from the composition buffer 95. The graphics controller 96 controls the reading timing of the decoder buffer 94 and the graphics plain generator 97 on the basis of the control information.

Furthermore, when the instructions for generating the image data of the HDR graphics is given from the controller 51 of FIG. 10, the graphics controller 96 reads the HDR color information 95A from the composition buffer 95 and provides the HDR color information. 95A to the CLUT management unit 98. On the other hands, when the instructions for generating the image data of the SDR graphics is given from the controller 51, the graphics controller 96 reads the SDR color information 95B from the composition buffer 95 and provides the SDR color information 95B to the CLUT management unit 98.

The graphics plain generator 97 generates the shape information of a graphics plane that is a graphics of a screen on the basis of the shape information items read from the decoder buffer 94. The graphics plain generator 97 outputs the generated shape information of the graphics plane to the CLUT management unit 98 at the reading timing controlled by the graphics controller 96.

The CLUT management unit 98 stores the CLUT on the basis of the HDR color information 95A or SDR color information 95B provided from the graphics controller 36. The CLUT is a table that links the value used as the pixel value of the shape information with the Y, Cb, Cr values and transparency of the palette_entry in the HDR color information 95A or SDR color information 95B corresponding to the value. The CLUT management unit 58 converts the shape information provided from the graphics plain generator 97 into the image data including the eight-bit Y, Cb, Cr values and transparency of each pixel in the graphics plane on the basis of the CLUT.

By this conversion, the CLUT management unit 98 (generator) generates the image data of the HDR graphics when the HDR color information 95A is provided from the graphics controller 96, and generates the image data of the SDR graphics when the SDR color information 95B is provided from the graphics controller 96. The CLUT management unit 98 outputs the generated image data of the HDR graphics or the generated image data of the SDR graphics to the synthesizing unit 60 of FIG. 10.

(Description of Process that Reproducing Device Performs)

Figure 12:
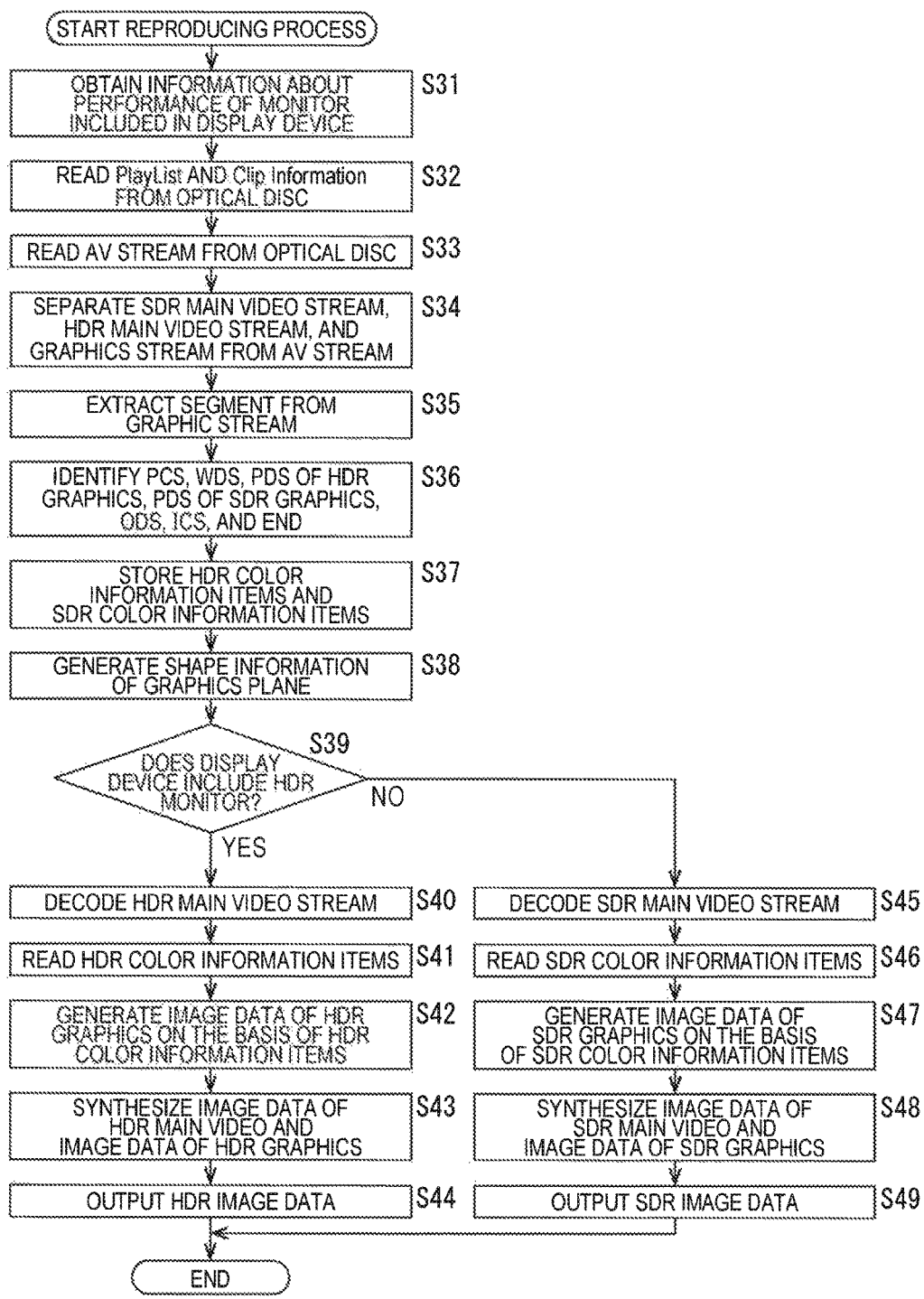
FIG. 12 is an explanatory flowchart of a reproducing process that a reproducing device illustrated in FIG. 10 performs.

FIG. 12 is an explanatory flowchart of a reproduction process that the reproducing device 2 of FIG. 10 performs. This reproduction process is started, for example, when the optical disc 11 is attached to the reproducing device 2.

In step S31 of FIG. 12, the HDMI communication unit 61 obtains the information about the performance of the monitor included in the display device 3 via the HDMI cable 4 from the display device 3, and outputs the information to the controller 51.

In step S32, the disc drive 52 reads the PlayList and Clip Information to be reproduced from the optical disc 11, and outputs the PlayList and Clip Information to the controller 51. The controller 51 controls the reproduction of the AV stream on the basis of the PlayList and Clip Information provided from the disc drive 52.

In step S33, the disc drive 52 reads the AV stream to be reproduced from the optical disc 11 and output the AV stream to the separating unit 57 in accordance with the control by the controller 51.

In step S34, the separating unit 57 separates the SDR main video stream, HDR main video stream, and graphics stream from the AV stream provided from the disc drive 52. The separating unit 57 outputs the separated SDR main video stream and HDR main video stream to the video decoder 58, and outputs the separated graphics stream to the graphics decoder 59.

The TS buffer 91 of the graphics decoder 59 (FIG. 11) stores the TS packets of the graphics stream provided from the separating unit 57 to output and store the graphics stream including the stored TS packets into the ES buffer 92.

In step S35, the processor 93 reads the graphics stream from the ES buffer 92, and extracts the segments from the read graphics stream.

In step S36, the processor 93 identifies the PCS, WDS, PDSs of the SDR graphics, PDSs of the HDR graphics, ODSs, ICS, and END on the basis of the segment_type included in each segment. The processor 93 provides the information items placed in the identified PCS, WDS, PDSs of the HDR graphics, PDSs of the SDR graphics, and ICS as the control information to the composition buffer 95. Furthermore, the processor 93 provides and stores the shape information items placed in the identified ODSs into the decoder buffer 94.

In step S37, the composition buffer 95 stores the control information including the HDR color information 95A and the SDR color information 95B and provided from the processor 93. The control information except for the HDR color information 95A and SDR color information 95B stored in the composition buffer 95 is read by the graphics controller 96, and used to control the reading timing of the decoder buffer 94 and the graphics plain generator 97.

In step S38, the graphics plain, generator 97 generates the shape information of a graphics plane on the basis of the shape information read from the decoder buffer 94 at the reading timing controlled by the graphics controller 96. The graphics plain generator 97 outputs the generated shape information of the graphics plane to the CLUT management unit 98 at the reading timing controlled by the graphics controller 96.

In step S39, the controller 51 determines whether the display device 3 includes an HDR monitor on the basis of the information about the performance of the monitor included in the display device 3 provided from the HDMI communication unit 61.

When it is determined in step S39 that the display device 3 includes an HDR monitor, the controller 51 instructs the video decoder 58 to decode the HDR main video stream, and at the same time, instructs the graphics decoder 59 to generate the image data of the HDR graphics. Then, the process goes to step S40.

In step S40, the video decoder 58 decodes the HDR main video stream provided from the separating unit 57, and outputs the image data of the HDR main video provided by the decoding to the synthesizing unit 60.

In step S41, the graphics controller 96 reads the HDR color information 95A from the composition buffer 95, and provides the HDR color information 95A to the CLUT management unit 98.

In step S42, the CLUT management unit 98 stores the CLUT on the basis of the HDR color information 95A to generate the image data of the HDR graphics from the shape information provided from the graphics plain generator 97 on the basis of the CLUT. The CLUT management unit 98 outputs the generated image data of the HDR graphics to the synthesizing unit 60.

In step S43, the synthesizing unit 60 synthesizes the image data of the HDR main video provided from the video decoder 58 and the image data of the HDR graphics provided from the CLUT management unit 98. In step S44, the synthesizing unit 60 outputs the HDR image data provided by the synthesis via the HDMI communication unit 61 to the display device 3. Then, the process is completed.

On the other hand, when it is determined in step S39 that the display device 3 does not include an HDR monitor, in other words, when the display device 3 includes an SDR monitor, the controller 51 instructs the video decoder 58 to decode the SDR main video stream. Meanwhile, the controller 51 instructs the graphics decoder 59 to generate the image data of the SDR graphics. Then, the process goes to step S45.

In step S45, the video decoder 58 decodes the SDR main video stream provided from the separating unit 57, and outputs the image data of the SDR main video provided by the decoding to the synthesizing unit 60.

In step S46, the graphics controller 96 reads the SDR color information 95B from the composition buffer 95, and provides the SDR color information 95B to the CLUT management unit 98.

In step S47, the CLUT management unit 98 stores the CLUT on the basis of the SDR color information 95B to generate the image data of the SDR graphics from the shape information provided front the graphics plain generator 97 on the basis of the CLUT. The CLUT management unit 98 outputs the generated image data of the SDR graphics to the synthesizing unit 60.

In step S48, the synthesizing unit 60 synthesizes the image data of the SDR main video provided from the video decoder 58 and the image data of the SDR graphics provided from the graphics decoder 59. In step S49, the synthesizing unit 60 outputs the SDR image data provided by the synthesis via the HDMI communication unit 61 to the display device 3. Then, the process is completed.

As described above, in the graphics stream are described different values as segment_types of the PDSs of the HDR graphics and the PDSs of the SDR graphics. Thus, the reproducing device 2 can identify the PDSs of the HDR graphics and the PDSs of the SDR graphics and generate the image data of the HDR graphics and the image data of the SDR graphics.

Note that, although there are two types of dynamic ranges of the colors of the graphics, an SDR and an HDR in the description above, there may be three types or more of dynamic ranges.

For example, when there are three types of dynamic ranges of the colors of graphics, an SDR, a first HDR, and a second HDR different from the first HDR, the DisplaySet of the caption stream has a structure illustrated in FIG. 13.

Differently from FIG. 5, in the DisplaySet of the caption stream, of FIG. 13 are placed the PDSs of the SDR captions, the PDSs of the first HDR captions, and the PDSs of the second HDR captions instead of the PDSs of the SDR captions and the PDSs of the HDR captions.

In the example of FIG. 13, 1 (an integer larger than or equal to one) types of color information can be used as the color information items of the SDR captions in a screen, and thus 1 PDSs of the SDR captions are provided. Meanwhile, m (an integer larger than or equal to one) types of color information can be used as the color information items of the first HDR captions in a screen, and thus m PDSs of the first HDR captions are provided. Furthermore, n (an integer larger than or equal to one) types of color information can be used as the color information items of the second HDR captions in a screen, and thus n PDSs of the second HDR captions are provided.

Furthermore, the PDSs of the SDR captions, the PDSs of the first HDR captions, and the PDSs of the second HDR captions are allotted different segment_types, respectively. For example, the PDSs of the SDR graphics, the PDSs of the first HDR graphics, and the PDSs of the second HDR graphics are allotted 0x14, 0x19, and 0x20 as the segment_types, respectively.

Second Embodiment (Description of Computer to which Present Disclosure is Applied)

The series of processes described above can be implemented either with hardware or with software. When the series of processes is implemented with software, a program in which the software is implemented is installed on a computer. In this example, the computer may be, for example, a computer installed on dedicated hardware, or a computer capable of performing various functions by various installed programs such as a general-purpose computer.

FIG. 14 is a block diagram of an exemplary configuration of the computer hardware that performs the series of processes with a program.

In the computer 200, a central processing unit (CPU) 201, a read only memory (ROM) 202, and a random access memory (RAM) 203 are connected to each other via a bus 204.

An input/output interface 205 is also connected to the bus 204. To the input/output interface 205 are connected an input unit 206, an output unit 207, a storage unit 208, a communication unit 203, and a drive 210.

The input unit 206 includes, for example, a keyboard, a mouse, or a microphone. The output unit 207 includes, for example, a display or a loudspeaker. The storage unit 208 includes, for example, a hard disc or a non-volatile memory. The communication unit 209 includes, for example, a network interface. The drive 210 drives a removable medium 211 such as a magnetic disc, an optical disc, a magneto-optical disc, or a semiconductor memory.

In the computer 200 having the configuration described above, the CPU 201 loads the program stored in the storage unit 208 via the input/output interface 205 and the bus 204 onto the RAM 203 and executes the program. This performs the series of processes.

For example, the program executed by the computer 200 (CPU 201) can be recorded in the removable medium 211 as a package medium and provided. Alternatively, the program can be provided via a wired or wireless transmission medium such as a local area network, the Internet, or a digital satellite broadcast.

In the computer 200, when the removable medium 211 is attached to the drive 210, a program can be installed via the input/output interface 205 onto the storage unit 208. Alternatively, the program can be received with the communication unit 209 via a wired or wireless transmission medium and installed onto the storage unit 208. Alternatively, the program can be installed on the ROM 202 or the storage unit 206 in advance.

Note that the program that the computer 200 executes may be a program by which the processes are performed chronologically in the order described herein, or may be a program, by which the processes are performed in parallel or at a necessary timing, for example, when the program is evoked.

Furthermore, herein, the system means a set of several components (devices, and modules (parts)). It does not matter if all the components are in a housing. Thus, both a plurality of devices that are stored in different housings and connected to each other via a network, and a device in which a plurality of modules are stored in a housing are a system.

The effects described herein are merely examples. The present technology is not limited to the effects and may have another effect.

Note that the embodiments of the present disclosure are not limited to the embodiments descried above, and can variously be changed without departing from the gist of the present technology.

For example, contents can be provided via broadcast waves or a network. In this case, the present disclosure can be applied to a set-top box or a television receiver that receives the broadcasting waves, or a personal computer that transmits and receives the data via the network.

Furthermore, the identification information used to identify the PDSs of the HDR graphics and the PDSs of the SDR graphics is not limited to the segment_type, and may be, for example, a palette_id that is a unique ID to a PDS and is described in the PDS. In this case, for example, the PDS in which the palette_id is described as a value in a predetermined range (for example, from 0 to 127) is identified as the PDS of the SDR graphics, and the PDS in which the palette_id is described as a value outside the predetermined range (for example, from 128 to 255) is identified as the PDS of the HDR graphics.

Furthermore, the composition buffer 95 of FIG. 1 stores both the HDR color information 95A and the SDR color information 95B in the description. The composition buffer 95, however, may store only one of the HDR color information 95A and the SDR color information 95B, whichever corresponds to the monitor of the display device 3.

Note that the present disclosure can have the following configurations.

(1)

An information processing apparatus including:

an identifying unit that identifies a first color information item that is information about a color in a first dynamic range available for graphics and a second, color information item that is information, about a color in a second dynamic range available for the graphics from a graphics stream including the first color information item, the second color information item, and identification information used to identify the first color information item and the second color information item on the basis of the identification information, and a generator that generates the graphics in the color in the first dynamic range on the basis of the first color information item identified by the identifying unit.

(2)

The information processing apparatus according to (1), wherein the generator generates the graphics in the color in the second dynamic range on the basis of the second color information item identified by the identifying unit.

(3)

The information processing apparatus according to (1) or (2), wherein the first color information, item, and the second color information item, are placed in segments, respectively, the identification information has a structure including a first segment type information item indicating a type of the segment in which the first color information item is placed and a second segment type information item indicating a type different from the type of the segment in which the first color information item is placed as a type of the segment in which the second color information item is placed.

(4)

The information processing apparatus according to (3), wherein the first segment type information item is placed in the segment in which the first color information is placed, and the second segment type information item is placed in the segment in which the second color information is placed.

(5)

The information processing apparatus according to (3) or (4), wherein each of the segment in which the first color information item is placed and the segment in which the second color information item is placed is a palette definition, segment (PDS).

(6)

The information processing apparatus according to any of (1) to (5), wherein the first dynamic range is a standard dynamic range (SDR), and the second dynamic range is a high dynamic range (HDR).

(7)

The information processing apparatus according to any of (1) to (6), wherein the graphics is a caption.

(8)

The information processing apparatus according to any of (1) to (7), wherein the graphics is a menu image.

(9)

An information processing method including:

an identifying step in which an information processing apparatus identifies a first color information, item that is information about a color in a first dynamic range available for graphics and a second color information item that is information about a color in a second dynamic range available for the graphics from a graphics stream including the first color information item, the second color information item, and identification information used to identify the first color information item and the second color information item on the basis of the identification information, and a generation step in which the information processing apparatus generates the graphics in the color in the first dynamic range on the basis of the first color information item identified by the identifying step.

(10)

A program for causing a computer to function as:
an identifying unit that identifies a first color information item that is information about a color in a first dynamic range available for graphics and a second color information item that is information about a color in a second dynamic range available for the graphics from a graphics stream including the first color information item, the second color information item, and identification information used to identify the first color information item and the second color information item on the basis of the identification information, and
a generator that generates the graphics in the color in the first dynamic range on the basis of the first color information item identified by the identifying unit.

(11)

A recording medium in which a graphics stream including a first, color information item that is information about a color in a first dynamic range available for graphics, a second color information item that is information about a color in a second dynamic range available for the graphics, and identification information used to identify the first color information item and the second color information item is recorded, the recording medium to be attached to an information processing apparatus and reproduced,
the recording medium causing the information processing apparatus provided with the graphics stream to identify the first color information item and the second color information item from the graphics stream on the basis of the identification information, and
to generate the graphics in the color in the first dynamic range on the basis of the identified first color information item.

(12)

An information processing apparatus including:
a generator that generates a graphics stream including a first color information item, that is information about a color in a first dynamic range available for graphics, a second color information item that is information about a color in a second dynamic range available for the graphics, and identification information used to identify the first color information item and the second color information item.

REFERENCE SIGNS LIST

1 Recording device
2 Reproducing device
11 Optical disc
23 Graphics encoder
95B SDR color information
95A HDR color information
93 Processor
98 CLUT management unit

The invention claimed is:

1. An information processing apparatus comprising:
circuitry configured to
identify a plurality of first color information items that include information about a color in a first dynamic range available for graphics and a plurality of second color information items that include information about a color in a second dynamic range available for the graphics from a graphics stream including the plurality of first color information items, the plurality of second color information items, and identification information used to identify each first color information item and each second color information item on the basis of the identification information, and
generate the graphics in the color in the first dynamic range on the basis of one or more of the plurality of identified first color information items or generate the graphics in the color in the second dynamic range on the basis of one or more of the plurality of identified second color information items,
wherein the plurality of first color information items are respectively placed in a plurality of first segments of the graphics stream and the plurality of second color information items are respectively placed in a plurality of second segments of the graphics stream, and
wherein each first segment includes the identification information used to identify a type of the respective first color information item and each second segment includes the identification information used to identify a type of the respective second color information item.

2. The information processing apparatus according to claim 1,
wherein the identification information comprises a structure including a first segment type information item indicating the type of each first segment in which the respective first color information item is placed or a second segment type information item indicating the type of each second segment in which the respective second color information item is placed, and
wherein the type of the second segment is different from the type of the first segment.

3. The information processing apparatus according to claim 2,
wherein the first segment type information item is placed in each first segment in which the respective first color information item is placed, and
wherein the second segment type information item is placed in each second segment in which the respective second color information item is placed.

4. The information processing apparatus according to claim 2,
wherein each segment of the plurality of first segments in which the plurality of first color information item items are respectively placed and the plurality of second segments in which the plurality of second color information items are respectively placed comprises a palette definition segment (PDS).

5. The information processing apparatus according to claim 1,
wherein the first dynamic range comprises a standard dynamic range (SDR), and the second dynamic range comprises a high dynamic range (HDR).

6. The information processing apparatus according to claim 1,
wherein the graphics comprise a caption.

7. The information processing apparatus according to claim 1,
wherein the graphics comprise a menu image.

8. An information processing method, implemented via at least one processor of an information processing apparatus, the method comprising:
identifying a plurality of first color information items that include information about a color in a first dynamic range available for graphics and a plurality of second color information items that include information about a color in a second dynamic range available for the graphics from a graphics stream including the plurality of first color information items, the plurality of second color information items, and identification information used to identify each first color information item and each second color information item on the basis of the identification information, and generating the graphics in the color in the first dynamic range on the basis of one or more of the plurality of identified first color information items or generating the graphics in the color in the second dynamic range on the basis of one or more of the plurality of identified second color information items, wherein the plurality of first color information items are respectively placed in a plurality of first segments of the graphics stream and the plurality of second color information items are respectively placed in a plurality of second segments of the graphics stream, and wherein each first segment includes the identification information used to identify a type of the respective first color information item and each second segment includes the identification information used to identify a type of the respective second color information item.

9. A non-transitory computer-readable medium having embodied thereon a program, which when executed by a computer causes the computer to execute a method, the method comprising:

identifying a plurality of first color information items that include information about a color in a first dynamic range available for graphics and a plurality of second color information items that include information about a color in a second dynamic range available for the graphics from a graphics stream including the plurality of first color information items, the plurality of second color information items, and identification information used to identify each first color information item and each second color information item on the basis of the identification information, and generating the graphics in the color in the first dynamic range on the basis of one or more of the plurality of identified first color information items or generating the graphics in the color in the second dynamic range on the basis of one or more of the plurality of identified second color information items, wherein the plurality of first color information items are respectively placed in a plurality of first segments of the graphics stream and the plurality of second color information items are respectively placed in a plurality of second segments of the graphics stream, and wherein each first segment includes the identification information used to identify a type of the respective first color information item and each second segment includes the identification information used to identify a type of the respective second color information item.

10. A non-transitory computer readable storage medium having embodied thereon a program, which when executed by an information processing apparatus of a computer, causes the information processing apparatus to execute a method, the method comprising:

recording a graphics stream including a plurality of first color information items that include information about a color in a first dynamic range available for graphics, a plurality of second color information items that include information about a color in a second dynamic range available for the graphics, and identification information used to identify each first color information item and each second color information item;

identifying each first color information item and each second color information item from the recorded graphics stream on the basis of the identification information; and generating the graphics in the color in the first dynamic range on the basis of one or more of the plurality of identified first color information items or generating the graphics in the color in the second dynamic range on the basis of one or more of the plurality of identified second color information items, wherein the plurality of first color information items are respectively placed in a plurality of first segments of the graphics stream and the plurality of second color information items are respectively placed in a plurality of second segments of the graphics stream, and wherein each first segment includes the identification information used to identify a type of the respective first color information item and each second segment includes the identification information used to identify a type of the respective second color information item.

11. An information processing apparatus comprising:

circuitry configured to generate a graphics stream including a plurality of first color information items that include information about a color in a first dynamic range available for graphics, a plurality of second color information items that include information about a color in a second dynamic range available for the graphics, and identification information used to identify each first color information item and each second color information item, wherein the plurality of first color information items are respectively placed in a plurality of first segments of the graphics stream and the plurality of second color information items are respectively placed in a plurality of second segments of the graphics stream, and wherein each first segment includes the identification information used to identify a type of the respective first color information item and each second segment includes the identification information used to identify a type of the respective second color information item.

12. The information processing apparatus according to claim 1, wherein the graphics stream includes the plurality of first segments and the plurality of second segments before one or more object definition segments, each object definition segment corresponding to both graphics generated in the color in the first dynamic range and graphics generated in the color in the second dynamic range, and wherein one or more shape information items are respectively placed in the one or more object definition segments.

* * * * *